United States Patent [19]
Haigh

[11] Patent Number: 5,952,849
[45] Date of Patent: Sep. 14, 1999

[54] LOGIC ISOLATOR WITH HIGH TRANSIENT IMMUNITY

[75] Inventor: Geoffrey T. Haigh, Boxford, Mass.

[73] Assignee: Analog Devices, Inc., Wilmington, Mass.

[21] Appl. No.: 08/805,075

[22] Filed: Feb. 21, 1997

[51] Int. Cl.⁶ ............................................. H03K 19/0175
[52] U.S. Cl. ................................ 326/82; 326/56; 326/86
[58] Field of Search .............................. 326/30, 56–58, 326/82, 86, 90

[56] References Cited

U.S. PATENT DOCUMENTS

| | | | |
|---|---|---|---|
| 3,714,540 | 1/1973 | Galloway | 321/2 |
| 4,027,152 | 5/1977 | Brown et al. | 250/199 |
| 4,118,603 | 10/1978 | Kumhyr | 179/16 E |
| 4,227,045 | 10/1980 | Chelcun et al. | 327/220 |
| 4,748,419 | 5/1988 | Somerville | 330/10 |
| 4,835,486 | 5/1989 | Somerville | 330/10 |
| 4,859,877 | 8/1989 | Cooperman et al. | 326/30 |
| 4,885,582 | 12/1989 | LaBarge et al. | 341/57 |
| 4,945,264 | 7/1990 | Lee et al. | 326/30 |
| 5,142,432 | 8/1992 | Schneider | 361/91 |
| 5,204,551 | 4/1993 | Bjornholt | 307/265 |
| 5,384,808 | 1/1995 | Van Brunt et al. | 375/36 |
| 5,396,394 | 3/1995 | Gee | 361/58 |
| 5,533,054 | 7/1996 | DeAndrea et al. | 375/286 |
| 5,588,021 | 12/1996 | Hunt et al. | 375/211 |
| 5,596,466 | 1/1997 | Ochi | 361/18 |

FOREIGN PATENT DOCUMENTS 25 29 296  1/1977  Germany .

OTHER PUBLICATIONS

Burr–Brown, "Dual, Isolated, Bi–Directional DIGITAL COUPLER", 1993 (No Month).

*Primary Examiner*—Jon Santamauro
*Assistant Examiner*—Don Phu Le
*Attorney, Agent, or Firm*—Hale and Dorr LLP

[57] ABSTRACT

A logic isolation circuit with high transient immunity has a link-coupled transformer assembly for providing isolation. An input circuit provides pulses that indicate rising and falling edges, and an output circuit on the isolated side of the barrier converts the signal with pulses back into a digital logic signal with rising and falling edges. An interrogation feature allows the output to be updated frequently. The logic isolator can be provided in a single module for use in a process control board, or it can be provided as multiple parts for mounting on a circuit board.

30 Claims, 10 Drawing Sheets

LOGIC ISOLATOR WITH HIGH TRANSIENT IMMUNITY

BACKGROUND OF THE INVENTION

This invention relates to a circuit for isolating digital logic signals, such as signals in a process control system.

In process control systems, logic signals are transmitted between equipment and microcontrollers to provide status information to the microcontrollers, and to provide control information to the equipment. The microcontrollers and the equipment should be electronically isolated so that transient signals do not inadvertently trigger erroneous status or control information. A well known method for achieving such isolation is to use optical isolators that convert digital logic signals to light pulses generated by light emitting diodes (LEDs), and then to convert the received light pulses back into digital logic signals. Optical isolators have a number of drawbacks, however: they require significant space on a card or circuit board, they draw a large current, they do not operate well at high frequency, and they are very inefficient.

An isolation amplifier that avoids the use of such optical couplers is described in Somerville, U.S. Pat. No. 4,748,419. In that patent, an input data signal is differentiated to create a pair of differential signals that are each transmitted across respective high voltage capacitors to create differentiated spike signals for the differential input pair. Circuitry on the other side of the capacitive barrier has a differential amplifier, a pair of converters for comparing the amplified signal against high and low thresholds, and a set/reset flip-flop to restore the spikes created by the capacitors back into a logic signal. In such a capacitively-coupled device, however, during a common mode transient event, the capacitors couple high, common mode energy into the receiving circuit. As the rate of voltage change increases in that common mode event, the current injected into the receiver increases. This current can potentially damage the receiving circuit and can trigger a faulty detection. Such capacitively coupled circuitry thus couples signals that should be rejected. The patent also mentions, without elaboration, that a transformer with a short R/L time constant can provide an isolation barrier, but such a differential approach is nonetheless undesirable because any mismatch in the non-magnetic (capacitive) coupling of the windings would cause a common-mode signal to appear as a difference signal.

SUMMARY OF THE INVENTION

The present invention includes a logic isolator with high transient immunity, for isolating digital logic signals, such as signals between equipment on a field side and microcontrollers on a system side in a process control system. In one aspect, the logic isolator has an input circuit that receives a digital input signal, with edge detection circuitry that detects rising and falling edges of that input signal. The input circuit provides an output signal indicative of those rising and falling edges to a transformer assembly which serves as an isolation barrier. The transformer assembly replicates the signal it receives and provides it to an output circuit, while shunting common mode transients to ground. The output circuit converts the signal from the transformer back into a digital logic signal with rising and falling edges as in the digital input signal. The transformer assembly preferably includes a linked-coupled transformer that has a first core with a first winding, a second core with a second winding, and a grounded link wire that extends from the first core to the second core for grounding capacitively linked common mode transients. Alternatively, a shielded transformer, such as a grounded double or single shield between two windings, could be used.

In preferred embodiments, the input circuit converts the rising and falling edges in the digital input signal to positive and negative pulses using tri-level logic, and the output circuit converts these pulses back into rising and falling edges. The input circuit preferably also includes a pulse generator for providing pulses, referred to as refresh pulses, with a high frequency and with a pulse width that is the same as the width of the pulses created in response to detection of a rising edge or a falling edge. The refresh pulses are logically combined with the input signal to provide an interrogating functionality that allows the isolator to determine the state of the input signal, and therefore, the isolator can recover quickly in case of a power spike or dropout, and also can quickly determine the state if an edge is missed. The isolator has circuitry that inhibits the first pulse after an edge to prevent a double-wide pulse; consequently, the isolator can interrogate the state of the input signal a time t after an event, with T<t<2T, i.e., no later than 10 uS if the refresh pulses have a period of 5 uS.

In another aspect, the invention includes a logic isolator that has an input circuit for sensing rising and falling edges and for providing a pulse signal indicative of the rising and falling edges to an isolation barrier, an output circuit for receiving the pulse signal from the isolation barrier and for converting the pulse signal back into a signal similar to the original input signal, and a pulse generator for providing refresh pulses that are used to interrogate the state of the input signal, thereby allowing the isolator to quickly recovery from a power-up condition or in case of a missed transition. In this aspect, the isolation barrier is preferably a transformer assembly similar to that described above, and the refresh pulses have a width equal to the width of the pulses created in response to detection of rising and falling edges.

The magnetically coupled logic isolator can be assembled and provided in a number of forms. One desirable assembly is as a module with multiple transformer assemblies, system side circuitry, and field side circuitry housed together in a single endosure and preferably designed for use in applications that have a field side and a system side separated by a physical isolation region. In this case, the module can also house a power transformer and power circuitry for coupling isolated power from the system side to components, such as analog-to-digital converters or programmable amplifiers, which are on the field side.

The logic isolator of the present invention can, alternatively, be provided in several different packaged components, e.g., a system side circuit in one package, a field side circuit in another package, and a transformer assembly in a third package. These three package components can be mounted as desired in some other system, such as a process control system. The use of multiple packaged components provides the end user of the logic isolator with flexibility in the placement of the components.

The isolator of the present invention can be used, for example, in an I/O portion of a process control system. The I/O portion can be implemented on a board that has a field side with terminals for connection to equipment oriented along parallel spaced-apart strips on the board, and a system side with a processor. The system side is separated from the field side with a physical isolation region. The isolator for each of the parallel strips is provided as a module with a width less than the width of the strips, and a length such that the module has I/O pins at each end of the module for connection to the system side and to the field side, with a region in the middle sized to bridge the physical isolation region. The isolator preferably has at least five channels, preferably formed to be bidirectional in response either to microprocessor control or to pin programming during assembly. In one implementation, one channel in the isolator is dedicated to transmitting control data from the system side to the field side, with the control data including programming data for the isolator's field side, such that the direction of the channels can be altered as desired. The module preferably includes a DC—DC converter transformer for providing power from the system side to the field side. In such an I/O board, the module provides significant saving in space compared to optical couplers with comparable capabilities while providing power to the field side to enable programmable signal processing on the field side.

The logic isolator of the present invention transmits logic signals in a manner that is faster, smaller, and with lower power consumption than optically isolated devices with similar capabilities, while providing substantial common mode transient immunity, e.g., at least 10 kV/uS, unlike an isolation barrier based on the use of capacitors. Multiple bidirectional data lines can be used and these lines can each be programmed to provide signals from the field side to the system side, or vice versa. The programming can be performed with pin programming that is performed when the device is assembled, or the programming can be done with a microprocessor, such that the direction of the line can be changed as desired. The input levels to the isolator are interrogated regularly so that after an event causing data loss, the system recovers quickly, e.g., between 5 uS and 10 uS. The isolator can be provided as a module that provides multiple channels in a small space, or it can be provided in multiple packages to provide the user of the isolator the flexibility to place the components over a board as desired to maximize the use of space. Other features and advantages will become apparent from the following detailed description, drawings and claims.

DETAILED DESCRIPTION

Figure 1:
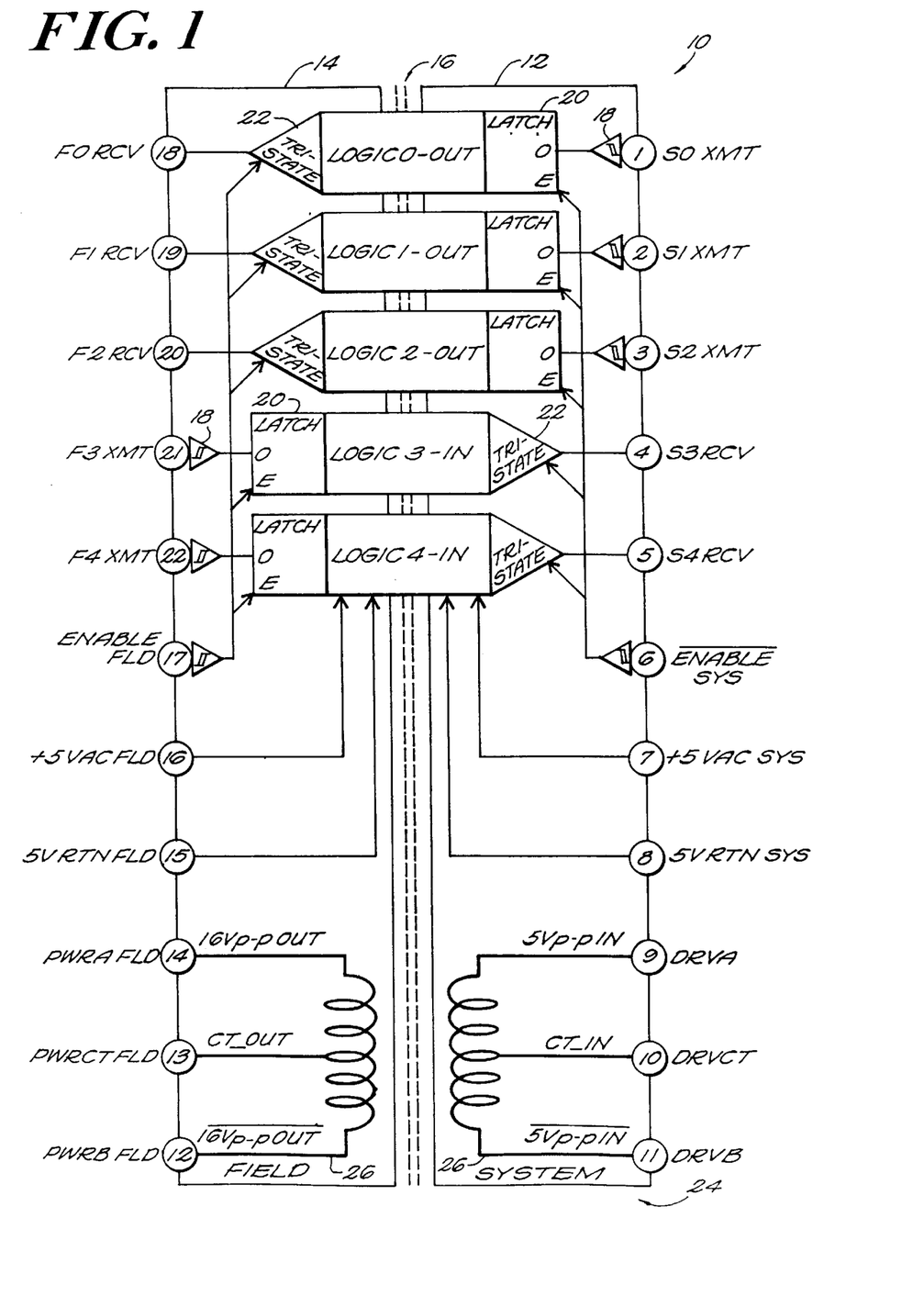
FIG. 1 is a chip layout and functional block diagram of a logic isolator according to an embodiment of the present invention.

Referring to FIG. 1, a logic isolator 10 according to an embodiment of the present invention is shown in a chip layout form in a packaged device that has 22 input/output (I/O) pins. Isolator 10 has five isolated digital logic lines LOGIC 0 to LOGIC 4, which couple a system side 12 with I/O pins S0 to S4 (pins 1–5, respectively) and an isolated field side 14 with I/O pins F0 to F4 (pins 18–22, respectively) across an isolation barrier 16. In this figure, two lines (LOGIC 3 and LOGIC 4) are shown in FIG. 1 as input lines (IN) for coupling data from field side 14 to system side 12, and three lines (LOGIC 0, LOGIC 1, and LOGIC 2) are shown as output lines (OUT) for coupling data from system side 12 to field side 14. As will be discussed below in more detail, each of the logic lines is bidirectional (at least when the circuitry is first made), and each can be separately programmed to be IN or OUT, either when assembled or in a system under control of a microprocessor.

The input side (as programmed) of each logic line has a Schmitt trigger 18 for ensuring fast transitions in the input signal and a transparent latch 20, while the output side of each logic line has a tri-state buffer 22. On each side of the isolator, control signals are provided to an ENABLE pin (pins 6 and 17). These control signals, along with other signals shown below, enable or disable tri-state buffers 22 and latches 20.

Isolator 10 receives input voltage signals with +5 Vdc and 5 V RTN on the system side through pins 7 and 8, and on the field side through pins 15 and 16. These voltages are provided to the active components in the circuitry of the logic lines.

In addition to multiple logic lines, isolator 10 may also have an isolated DC—DC power converter 24 with a center-tap transformer 26 to couple power from system side 12 to field 14 side to power active circuitry on the field side. The converter may be packaged with the logic lines, or it can be housed and mounted separately. In this embodiment, transformer 26 is rated at 3 kV RMS, and is driven with a 5 V peak-to-peak square wave at the primary side at inputs DRVA and DRVB. Transformer 26 can deliver a 32 V peak-to-peak square wave output across outputs PWRA and PWRB with a power of 670 mW. This power is sufficient to generate a regulated 5 V DC supply for an isolated circuit, and 24 V for a 4/20 mA loop supply.

Figure 2:
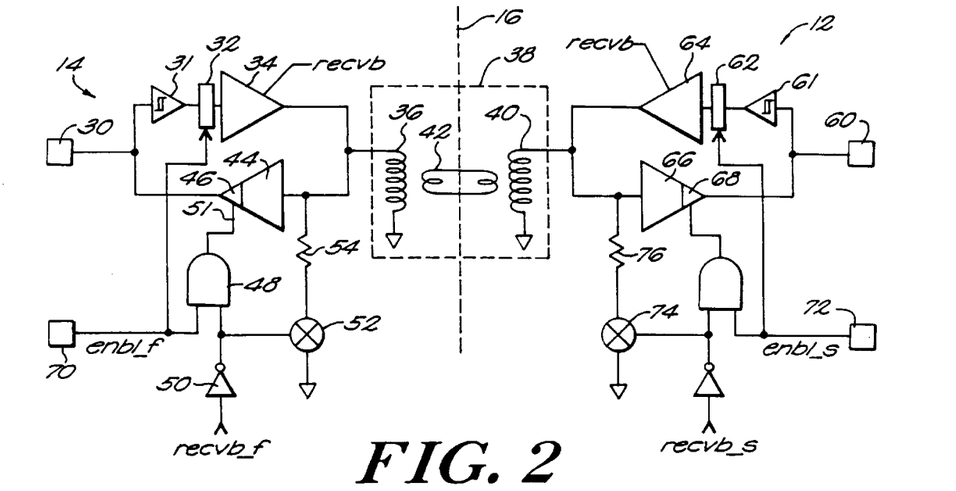
FIG. 2 is a schematic of circuitry in a single channel in a logic isolator such as that shown in FIG. 1.

FIG. 2 is a simplified block diagram to provide a general overview of circuitry in a single logic line 28. In logic line 28, field side 14 and system side 12 are substantially identical to each other. Depending on the programming of the logic line, each side will either be in a transmit mode or in a receive mode. Turning first to field side 14, data is received in or provided out through an I/O pin 30. In a transmit mode, input data is received at I/O pin 30 and is provided to a Schmitt trigger 31 and then to a transparent latch 32. The latched data is provided to a transmit circuit 34, which has edge detection circuitry that senses rising and falling edges in the digital latched data, and provides to a first winding 36 of a transformer in a transformer assembly 38 a data signal with pulses that indicate the rising and falling edges. In a receive mode, data is received from winding 36 and is provided to a receive circuit 44 that has a tri-state buffer 46. Receive circuit 44 converts data with pulses that indicate rising and falling edges into a digital signal with rising and falling edges that indicate the same relative locations as the rising and falling edges in the input signal. The resulting output signal from tri-state buffer 46 is provided out via I/O pin 30, and it should be substantially the same as an input signal received on the other side, with some propagation delay through the isolator.

Similarly, system side 12 has an I/O pin 60, a Schmitt trigger 61, a transparent latch 62, and a transmit circuit 64 for providing a signal to a second winding 40 when in a transmit mode; and has a receive circuit 66 with a tri-state buffer 68 for receiving signals from second winding and for providing a signal to I/O pin 60 when in a receive mode.

The system side and the field side are each programmed in an opposite manner, so that one side is generally in a transmit mode and one side is in a receive mode, although in an initial state, both sides can be put in the receive mode to prevent unwanted signal coupling. The determination of whether field side 14 and system side 12 are in transmit mode or in receive mode is made by an enabling signal (enbl) which is provided from an I/O pin 70 (as shown in FIG. 1), and also from a receive bar signal (recvb) (the "bar" refers to the fact that the signal is active low, i.e., it is low when the side is in the receive mode, and high when in the transmit mode). As represented here for illustrative purposes, signals enbl and recvb (via an inverter 50) are both provided to an AND gate 48, which provides a control signal 51 to tri-state buffer 46 so that buffer 46 provides output data to I/O pin 30 when enabled and the field side is thus in the receive mode. The receiver output is enabled only if both enbl and recvb are active. The enbl signal is also provided to an enabling input of latch 32, while recvb is provided to transmit circuit 34 to enable the transmit circuit to transmit if recvb is high (i.e., inactive for receiving). Signal recvb is also provided via inverter 50 to a switch 52. A resistor 54 is connected between winding 36 and switch 52, and another output of switch 52 is coupled to ground. The resistor is about 3 kOhm, and is used for damping when the field side is in the receive mode.

System side 12 similarly receives an enbl signal at an enable pin 72 and a recvb signal for controlling latch 62, transmit circuit 64, buffer 68, and a switch 74 (for opening a path through a damping resistor 76 to ground).

Figure 3:
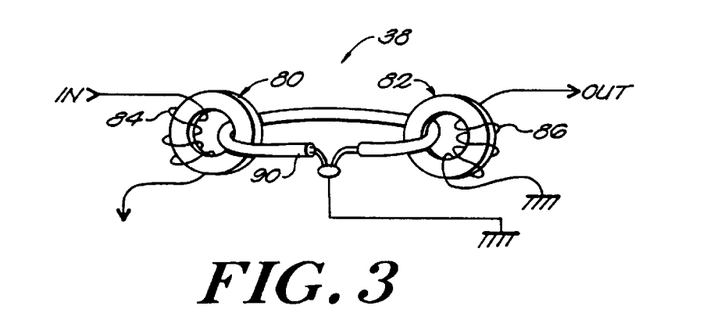
FIGS. 3 and 4 are respective perspective and schematic views of an embodiment of a transformer assembly used in the logic isolator of FIG. 2.
Figure 4:
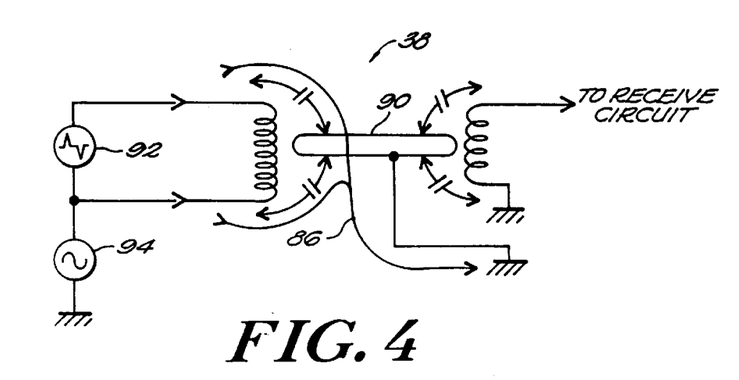

Referring also to FIGS. 3 and 4, the isolation in the signals is provided by transformer assembly 38, which is shown here in more detail and in perspective and schematic form. Transformer assembly 38 has two small ferrite toroidal cores 80 and 82 with a small number of respective windings 84 and 86 (corresponding to windings 38 and 40 in FIG. 2) around each core. Cores 80 and 82 are spaced apart as desired to reduce capacitive coupling, and a heavily insulated link wire 90 is provided with one or two turns around both cores and grounded to provide galvanic isolation. As illustrated in FIG. 4, with a digital input signal 92 and an additional common mode signal 94 across windings 84, common mode signal 84 will be diverted along a signal path 86 to ground through the grounding connection of link wire 90, rather than into a receive circuit on the other side of the logic line.

Figure 5A:
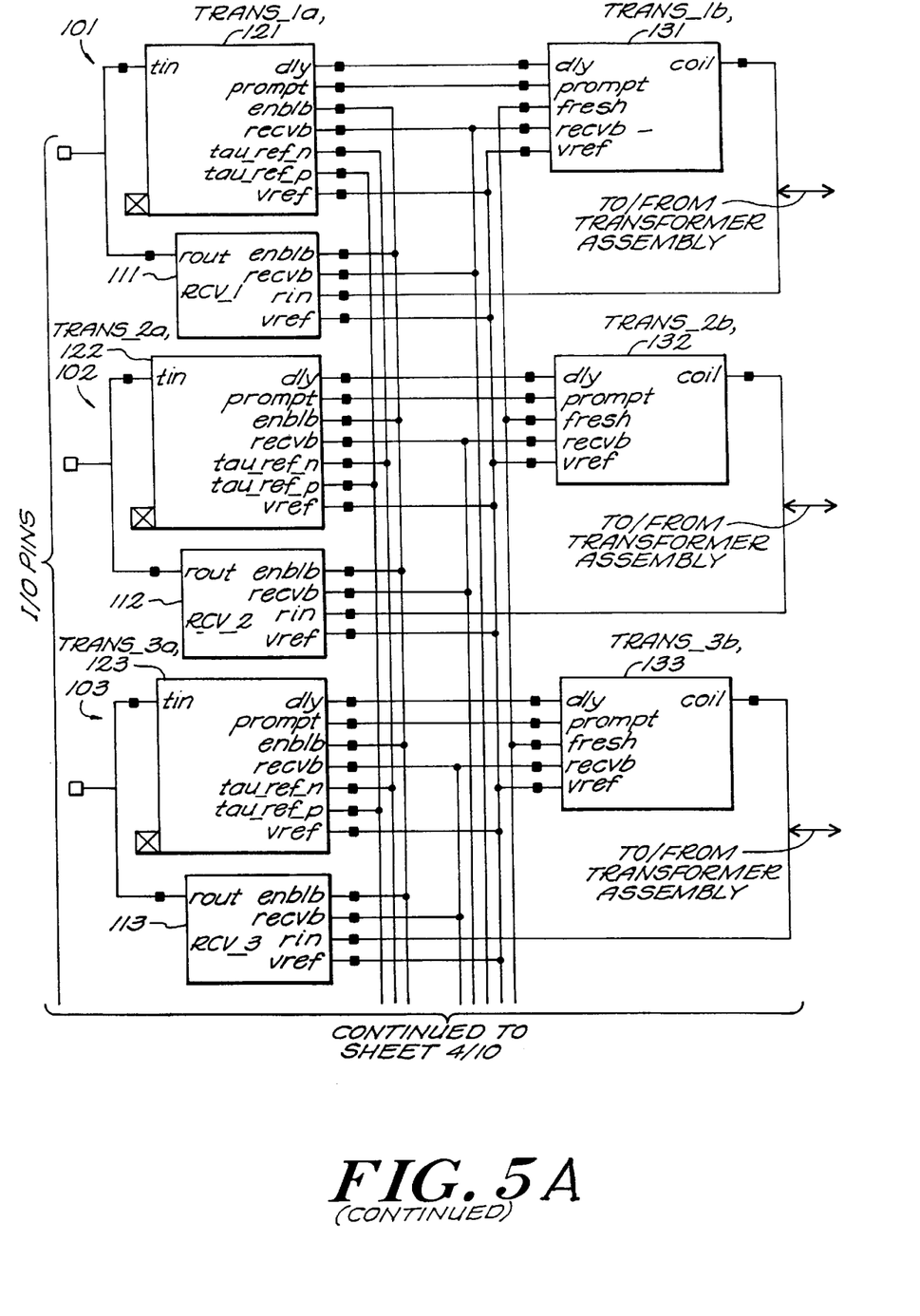
FIG. 5A–5C are block diagram of circuitry on one side of the isolation barrier for multiple channels.
Figure 5B:
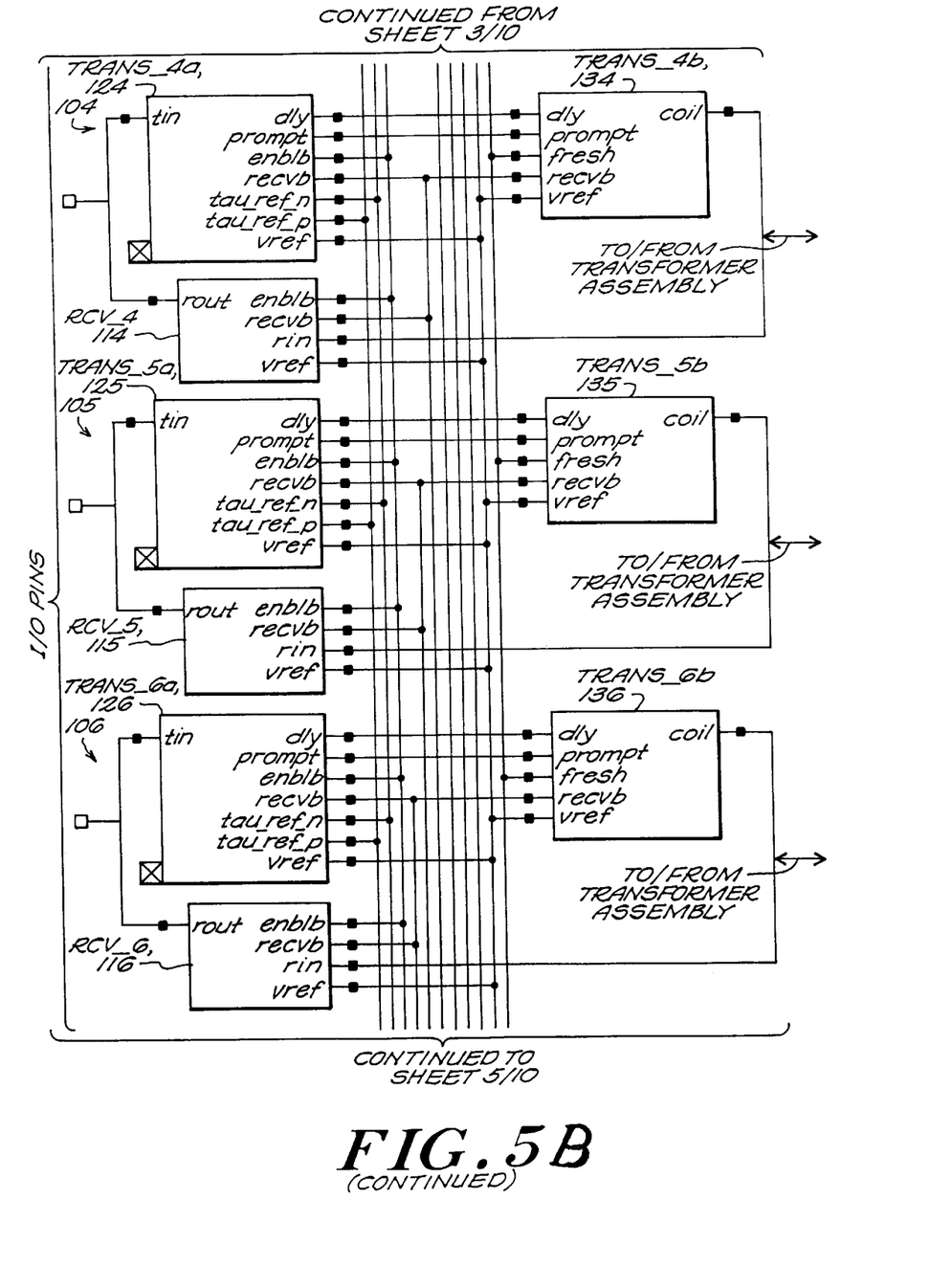
Figure 5C:
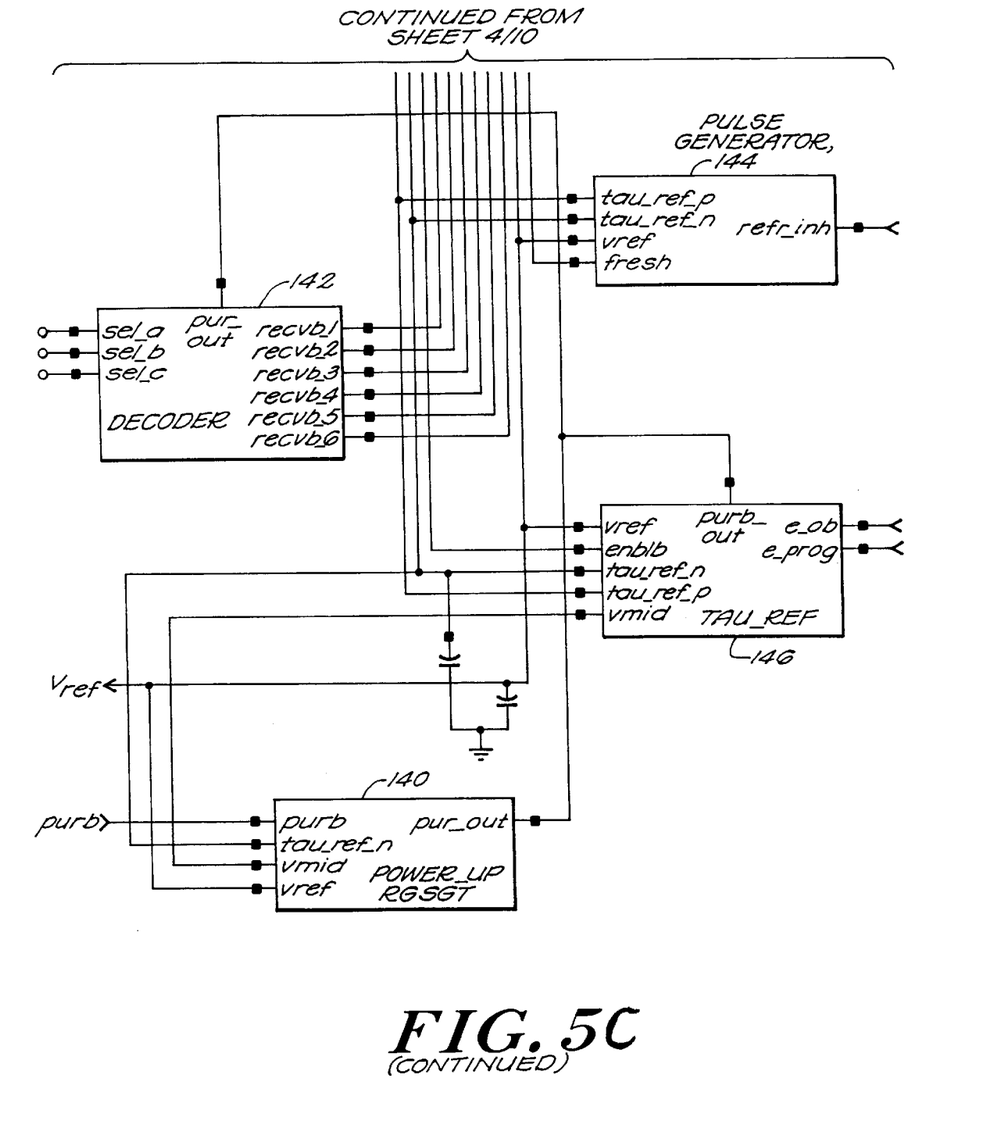

Referring to FIG. 5, the transmit and receive circuits are described in more detail. In the block diagram of FIG. 5, which illustrates one side (either a field side or a system side), of an isolator that has six logic lines 101–106. As shown here, each logic line n has a receive circuit 111–116 indicated as RCV_n and a transmit circuit which, for convenience, is broken up here into two circuits, TRANS_na 121–126 and TRANS_nb 131–136. Note that the dly signal and prompt signal shown between TRANS_na and TRANS_nb are signals at internal lines in the transmit circuit.

Each side has a power up reset circuit 140 that receives a power up reset bar signal (purb) and in response provides a power-up reset output signal (pur_out). The purb is received from electrostatic discharge (ESD) protection circuitry. The ESD circuitry is not shown in FIG. 5, but ESD protection is provided at each I/O pin and at each of the nodes where the circuitry is connected to the coils. The pur_out signal controls what happens on power-up or on the occurrence of some other major power spike.

Each transmit circuit and each receive circuit receives two signals, enblb (enable bar) and recvb (receive bar), for enabling and disabling the transmit circuit and the receive circuit on each side of the logic line, thereby putting each side into a transmit mode or a receive mode. The receive bar signals, recvb_n, are provided to the transmit and receive circuits from a decoder 142, which provides the recvb signals based on three input select lines sel_a, sel_b, and sel_c, and also based on the pur_out signal. The select lines are decoded using logic circuitry of a type that is generally known for converting a three-bit input into a six-bit output. Assuming that the IN lines and OUT lines are always grouped together and assuming that the IN lines always begin with the first logic line (LOGIC 0 in FIG. 1), there would only be six total combinations for six logic lines, i.e. wherever the transition between IN lines and OUT lines occurs.

When the decoder receives an active pur_out signal, the decoding circuitry causes all of the recvb signals to go active low, thereby putting each logic line in a receive mode. Consequently, on a power spike, with all the logic lines in a receive mode on each side, no new data can be transmitted across the isolation barrier.

The system has a pulse generator 144, which receives voltage reference signals and provides pulses with a signal referred to here as the refresh signal. The refresh pulses are provided only to TRANS_nb circuits 131–136. This refresh signal and its use are explained in more detail below. Pulse generator 144 also has an input lead for receiving an inhibit signal refr_inh to prevent the refresh pulses from being provided. The inhibit signal can be provided at the wafer level for testing purposes.

The enblb signal, Vref, other reference signals referred to as tau_ref_n and tau_ref_p, are all provided from a block TAU_REF 146. The tau_ref signals are used mainly to bias transistor current sources, while the Vref signal, preferably +2.5 v, is used to establish tri-level logic to distinguish pulses that indicate rising and falling edges. TAU_REF 146 has logic that causes the enblb signals to go inactive high when pur_out goes high, thereby causing the transparent latch on each side of the logic lines to be inactive and therefore unable to transmit any signal after a power failure or after some other ESD event.

Figure 6:
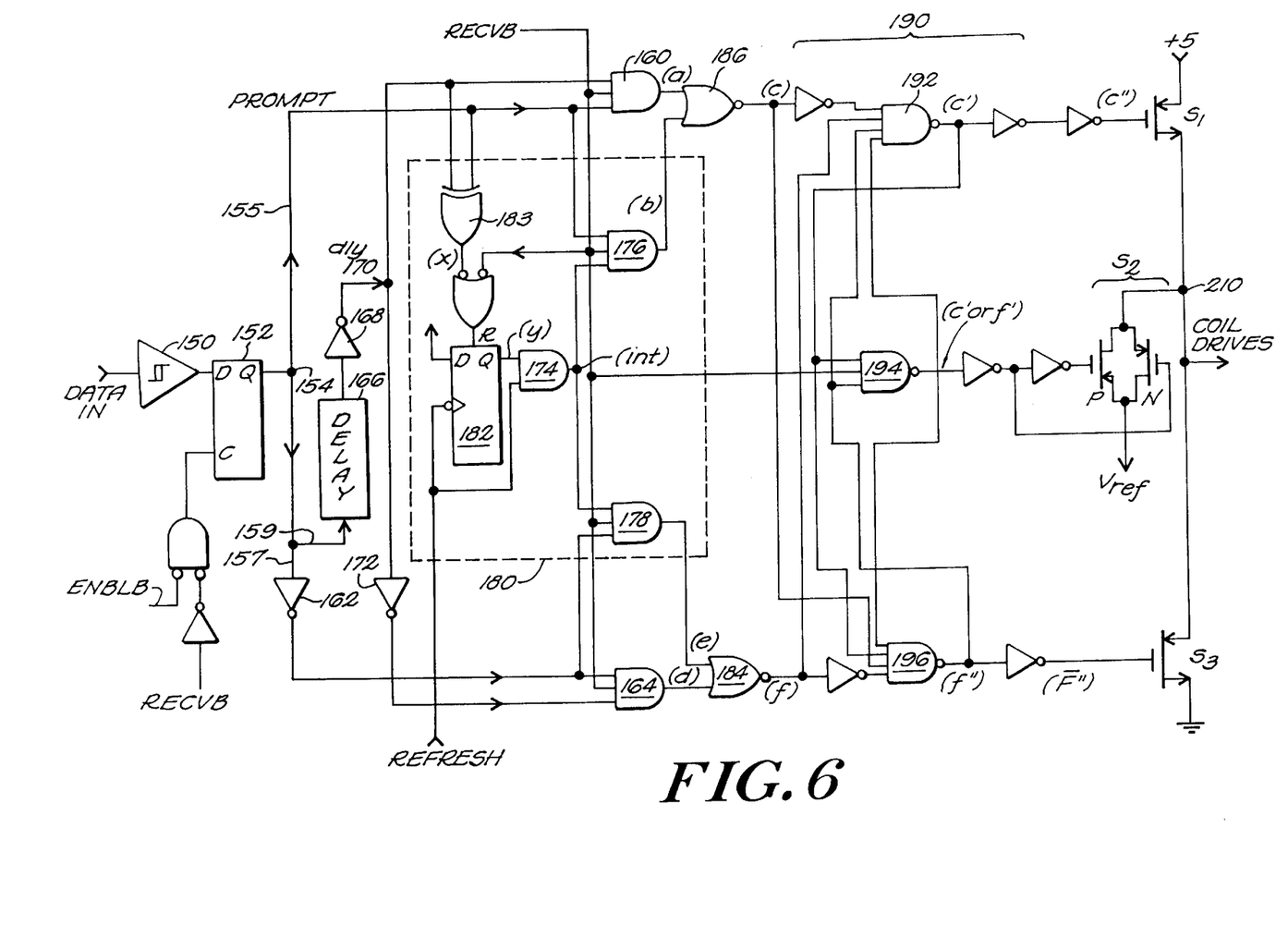
FIGS. 6 and 7 are schematics of the transmit and receive circuits shown in block diagram form in FIG. 5.
Figure 8:
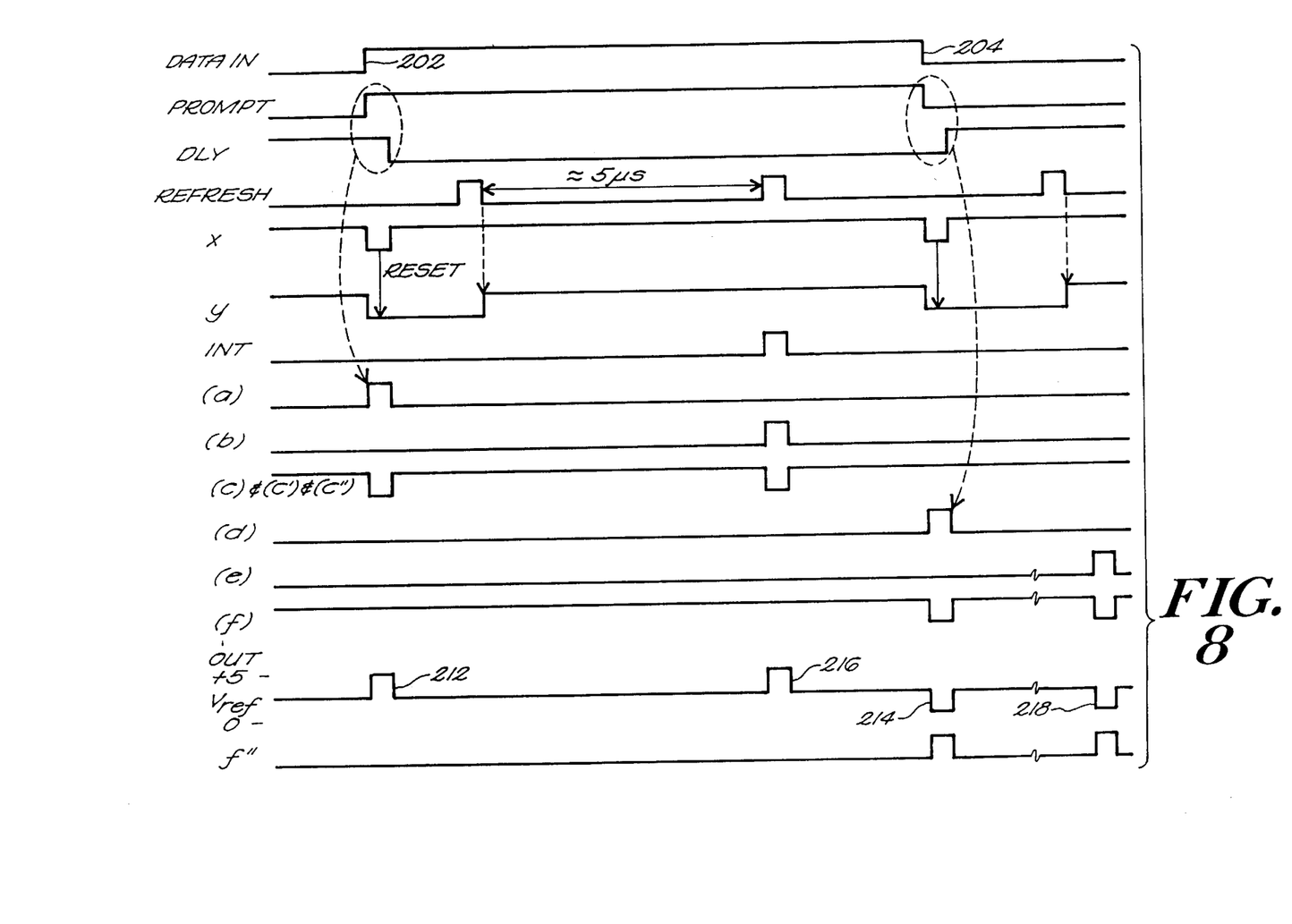
FIG. 8 is a timing diagram illustrating signals at selected portions of the circuitry in the schematics of FIGS. 6–7.

A more detailed view of a representation of one of the transmit circuits with TRANS_nA 121 and TRANS_nb 131 together is shown in FIG. 6, and described with also reference to the waveforms shown in FIG. 8. An input signal DATA IN is provided from an I/O pin to a Schmitt trigger 150, which insures fast edge transitions. As shown in FIG. 8, DATA IN has a rising edge 202 and a falling edge 204. Schmitt trigger 150 receives DATA IN and provides an output signal to a transparent latch 152, which is controlled by enblb and recvb. Schmitt trigger 150 and transparent latch 152 are each components of a generally known type, so further detail is not provided here.

The output of latch 152, referred to as the "prompt" signal in FIGS. 5 and 6, is provided along multiples data paths from a node 154. In a first path 155, the prompt signal is provided to a first input of an AND gate 160. In a second path 157, the prompt signal is inverted with an inverter 162, and the resulting signal is provided to a first input of an AND gate 164. In a third path 159, the prompt signal is provided to a digital delay 166, which delays the signal by a fixed amount, e.g., about 15 nS, and then to an inverter 168 to produce an inverted delayed signal, dly, at a node 170. The dly signal is a delayed and inverted version of the DATA IN signal as shown in FIG. 8. The dly signal is provided to a second input of AND gate 160, and is also provided to an inverter 172, with the resulting signal being provided to a second input of AND gate 164. AND gates 160 and 164 also receive a third input from the recvb signal. In transmit mode, however, this recvb signal is always high, and therefore it is irrelevant as the remaining inputs are ANDed as if recvb were not present (if recvb does go low indicating that the side should be in receive mode, AND gates 160, 164, 176, and 178 are all turned off).

The output of AND gate 164 is usually low, but has positive pulses in response to a rising edge of DATA IN; while the output of AND 160 is usually low but has positive pulses in response to a falling edge of DATA IN. The use of a delay and logic circuitry thus serves as edge detection circuitry for converting the rising and falling edges to pulses. Other approaches are known for edge detection, such as differentiating with a high-pass circuit; but such an approach would make the desirable interrogation function described below very difficult to implement.

Meanwhile, an interrogation circuit 180 receives a refresh signal with periodic refresh pulses with a period T, e.g., about 5 uS, with pulses having a pulse width that is the same as the delay from delay 166, i.e., about 15 nS in the above-mentioned example. These refresh pulses are provided to a flip-flop 182, which also receives an input from an XOR gate 183. The signal from XOR gate 183 inhibits the refresh pulses from being provided for one pulse after XOR output signal (x) goes low. Inhibiting a refresh pulse soon after a pulse occurs due to a rising or falling edge prevents the occurrence of a double-wide pulse which could otherwise cause the current across the transformer to ramp up too high. XOR gate 183 receives the prompt and dly signals, which are usually different and thus the output of XOR gate 183 is usually high, except for the duration of the delay time after a rising or falling edge as shown in signal (x) in FIG. 8.

The output of flip-flop 182, signal (y) in FIG. 8, is usually high except after being reset by a low signal from XOR 183. Flip-flop 182 is again set on a falling edge of the next refresh pulse. Signal (y) is then ANDed by an AND gate 174 with the refresh signal to produce an interrogation signal, int. The int signal is usually low because the refresh signal is low except for the periodic pulses, while signal (y) is usually high except from the occurrence of a rising or falling edge (and hence low XOR signal) until the falling edge of the next refresh pulse. Consequently, the int signal is the same as the refresh signal, except that it effectively omits the first pulse after a transition in the DATA IN signal. The int signal is ANDed with the prompt signal by AND gate 176, and is ANDed with an inverted prompt signal by AND gate 178.

AND gates 160 and 176 produce signals (a) and (b), respectively. Signal (a) is usually low but has a pulse on a rising edge of DATA IN. Signal (b) from AND gate 176 is usually low except that it has high pulses when the refresh is high, DATA IN is high, and the pulse is not the first pulse after a reset of flip-flop 182. Signals (a) and (b) are provided to NOR gate 186. The usually low input signals will produce a usually high output signal (c) which has low pulses that effectively combine the pulses of signals (a) and (b).

Meanwhile, AND gates 164 and 178 produce output signals (d) and (e), respectively, and provide these signals to NOR gate 184 to produce an output signal (f). Signal (d) is usually low except for a high pulse with a pulse width equal to the delay in delay 166 during a falling edge of DATA IN. Signal (e) is usually low except for a high pulse which occurs on the second refresh pulse after a falling edge, and when input signal DATA IN is low. Signal (f) from NOR gate 184 is usually high except when either there is a falling edge, or the value of DATA IN is low with the exception of the first pulse after a falling edge.

Accordingly, signal (c) indicates either a rising edge or that the DC level of DATA IN is high; while signal (f) indicates either a falling edge and that the DC level of DATA IN is low. In signal (c), if for some reason the rising edge were not accurately detected to produce the first downward pulse in signal (c), a downward pulse would be provided between 5 uS and 10 uS later (or more generally between T and 2T, where T is the period of the refresh pulse). That downward pulse could be detected to indicate the DC level of the DATA IN signal. Signals (c) and (f) are provided in an inverted form and in a non-inverted form to NAND gates 192, 194, and 196 that make up non-overlap circuitry 190 which improves the subsequent switching.

A signal (c"), which is substantially the same as signal (c), is provided to a control terminal (gate) of a p-type transistor (FET), which serves as a first switch S1. Signals c' and f' are provided through a first inverter to a control terminal of an n-type transistor, while twice inverted signals c' and f' are provided to a control terminal of a p-type transistor. Each of these transistors has a drain at $V_{ref}$, preferably at 2.5 V. These switches together form a second switch S2. A signal (f"), which is inverted version of signal (f), is provided to the control terminal of an n-type transistor, which serves as a switch S3.

Switch S2 referenced to $V_{ref}$ effectively creates a tri-level logic output at an output node 210 (coupled to a first winding of the transformer assembly). The output signal will typically be at a voltage of 2.5 V, except during the pulses in signals (c) and (f). The low pulses on signal (c) couple the +5 V voltage to output node 210 through switch S1 to create a high pulse, while high pulses on signal (f") ground output node 210 through switch S3 and thus cause an output voltage at 0 V and hence a low pulse. Non-overlap circuitry 190 ensures that switch S1 or switch S3 is turned off before the other can be turned on.

Referring to the output signal OUT in FIG. 8, as is shown here there is a positive pulse 212 in response to rising edge 202 and a negative pulse 214 in response to falling edge 204. In addition, there is a positive pulse 216 which indicates that the DC level of DATA IN is high, and a negative pulse 218 which indicates that the DC level of DATA IN is low. As noted above, these pulses are in response to periodic interrogation of the DC level of DATA IN and allow the system to recover within a time between T and 2T, with T being the period of refresh pulses. Therefore, even if a rising or a falling edge is, for whatever reason, not detected, the DC state of DATA IN will be recovered quickly.

Figure 13:
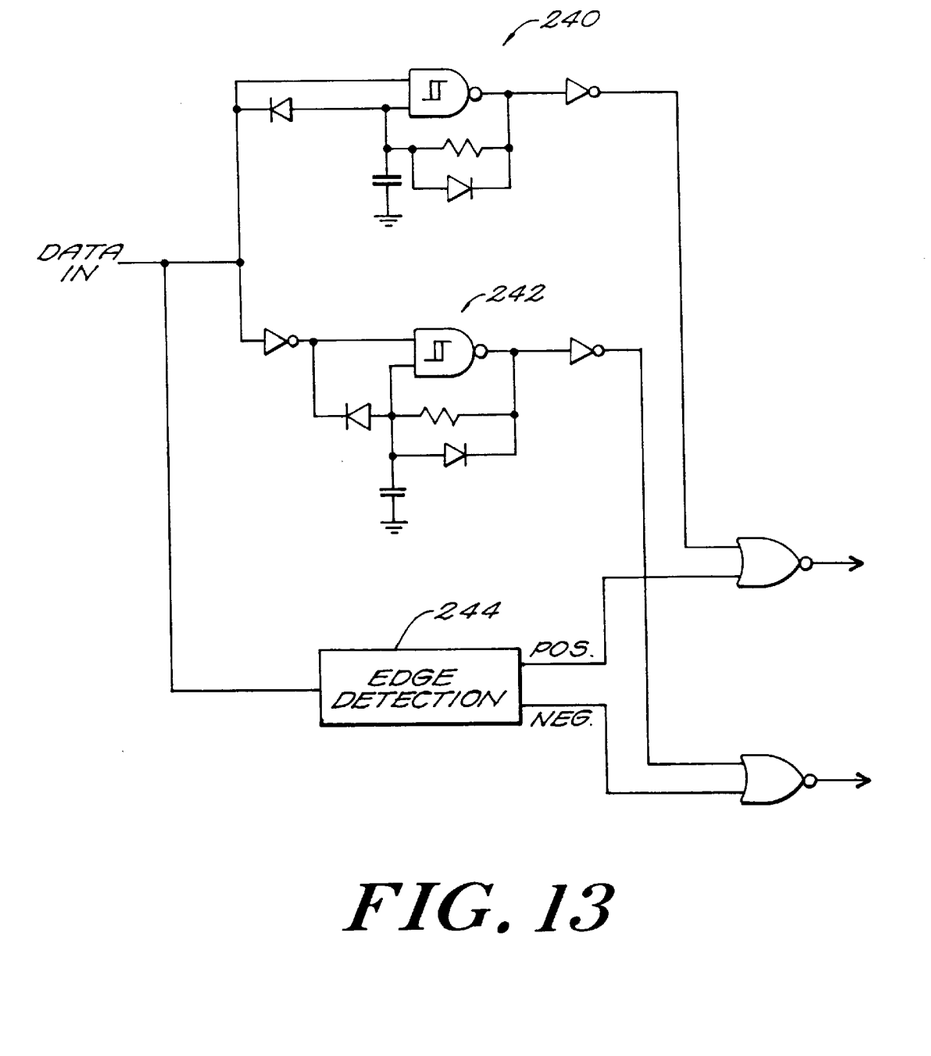
FIG. 13 is a schematic of a portion of a transmit circuit according to another embodiment of the present invention.

While a specific set of logic has been shown here for combining the signals and for providing the interrogation signals, other approaches could be used. Referring to FIG. 13 for example, a DATA IN signal can be provided to two respective pulse generators 240 and 242, the first of which provides a low pulse when DATA IN is high, and the second of which provides a low pulse when DATA IN is low. These outputs are respectively NORed with pulses generated by edge detection circuitry 244 that provides pulses indicating rising (positive) edges or falling (negative) edges. By their design, pulse generators 240 and 242 prevent pulses from being provided for one period after an edge is detected.

Figure 7:
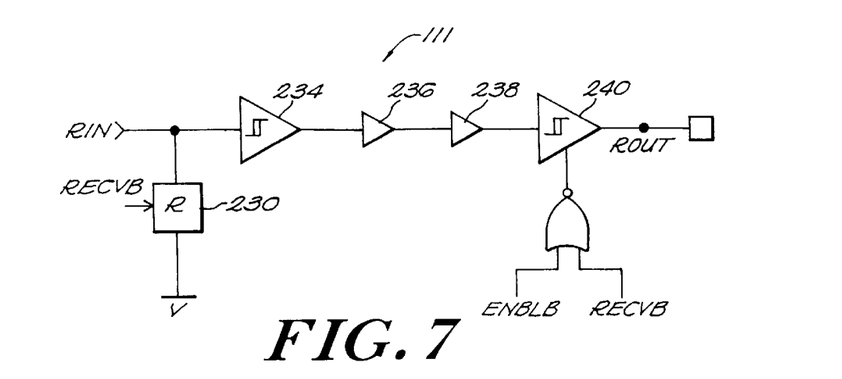

Referring to FIG. 7, receive circuit 111 receives an input signal r_in from a winding of the transformer assembly. The r_in signal is coupled to a reference voltage V with a damping resistor 230 that is activated only when recvb_1 is active low and thus receive circuit 111 is in receive mode and enabled to receive. The r_in signal is provided to a Schmitt trigger 234 which triggers, for example, at input voltage of +1 V and +4 V for sensing low and high pulses. The output of Schmitt triggers 234 is provided to two buffers 236 and 238, and then to a tri-state output buffer 240 to produce an output signal r_out when buffer 240 is enabled by enblb and recvb both being active low. The receive circuit thus provides an output signal, isolated from the input signal, with rising and falling edges at the same relative locations as the input signal (with some small propagation delay for the entire signal; e.g., 14 nS).

Figure 9:
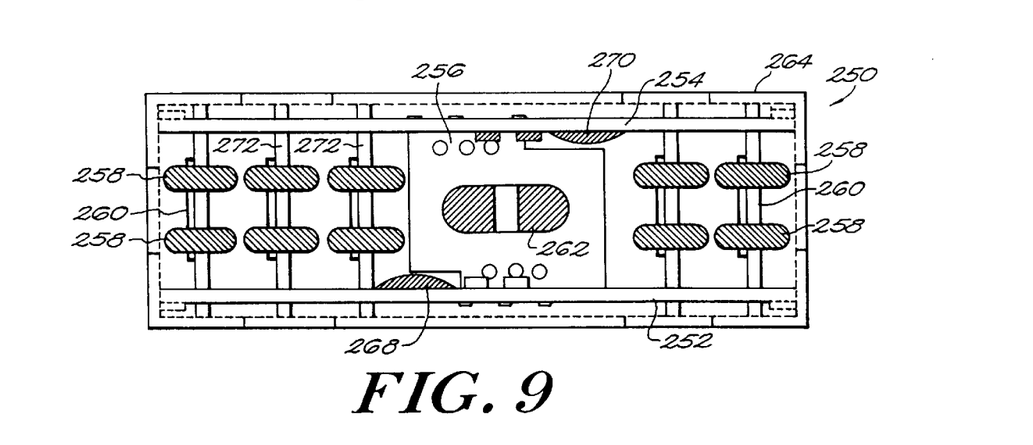
FIGS. 9 and 10 are a top view and a side view, respectively, of a logic isolator implemented as a module with multiple channels and with a power transformer.
Figure 10:
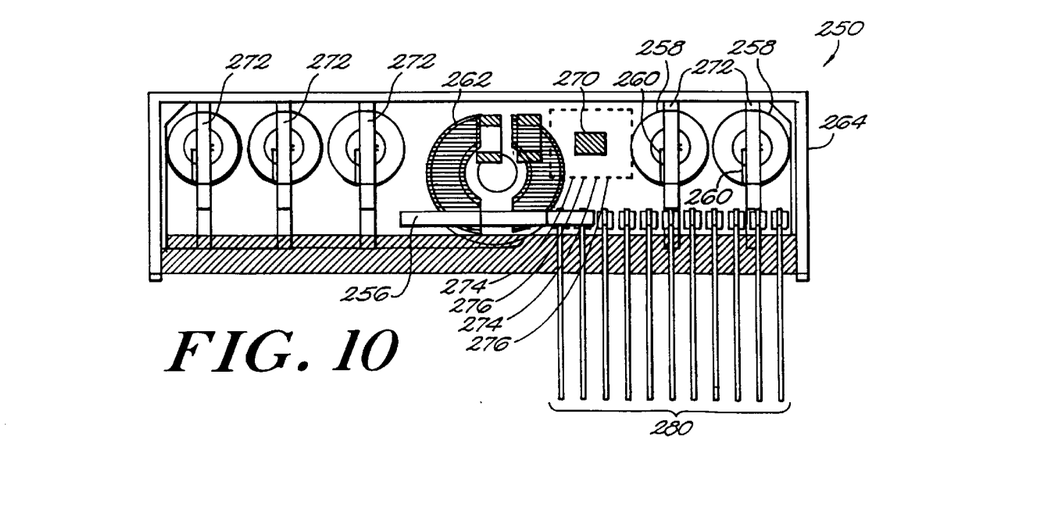

The logic isolator of the present invention can be housed in a number of ways. FIGS. 9–10 illustrate one implementation for housing a logic isolator with five logic lines. In this embodiment, the isolator is formed as a rectangular module 250 with two side walls made from circuit boards, referred to as a system side printed circuit board (PCB) 252 and a field side PCB 254. Mounted along PCBs 252 and 254 are integrated circuits (ICs) 268 and 270, respectfully. These ICs are preferably mounted using a known chip-on-board technique in which the IC is mounted to the PCB, and is then covered with an encapsulating liquid that hardens over the IC. The transformer assemblies include ten toroidal cores 258, five mounted to each of the PCBs, with the cores link-coupled with five link lines 260 that link two of the toroidal cores.

The module is enclosed with a plastic molded housing 264. As shown here, PCBs 252 and 254 are oriented vertically along the long sides of module 250, and five supports 272, each for holding two of cores 258 and one link wire 260 that make up each transformer assembly, are oriented vertically and perpendicular to PCBs 252 and 254, extending across the short side of module 250. The cores are thus held up off the bottom of the module with supports 272.

Power can be provided from the system side to the field side is through circuits on a power paddle PCB 256 mounted horizontally, and a large power toroidal core 262.

As noted above in connection with the select lines provided to a decoder to produce recvb signals, it was noted that the signal lines could be selected based on pin programming. Referring particularly to FIG. 10, to accomplish this, the PCB has certain bond pads 274 that are grounded, and certain bond pads 276 coupled to a +5 V supply. These bond pads are positioned at a location near the select lines of IC 270 when IC 270 is mounted on PCB 254. When IC 270 is actually mounted on PCB 254, bond wires are provided from the select pins on the IC to the bond pads with the desired reference voltage to create the appropriate combination of recvb signals, thereby controlling which lines will be IN lines and which lines will be OUT lines.

As is also shown in FIG. 10, module 250 has eleven I/O pins 280 formed in a row along one side of the module for connection to PCB 254 and power paddle 256 and at one end of the module for field side connections (see also the exemplary pinout represented in FIG. 1). Eleven other I/O pins, not shown here, would be provided at the other end of the module and on the other side of the module for connection to the system side circuitry.

Figure 12:
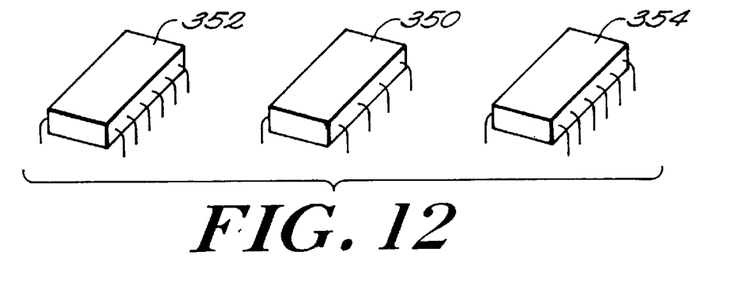
FIG. 12 is a pictorial view illustrating an implementation of the isolator according to another embodiment of the present invention.

The implementation shown in FIGS. 9 and 10 is but one specific implementation that could be used, but other implementations could be employed. Referring to FIG. 12, for example, the transformer assemblies and the circuitry need not be housed in a single module; rather, these components could be distributed on a circuit board or on a card in a process control system to take up unused space and maximize the use of space on that card. In one embodiment, each logic line includes a packaged transformer assembly 350, preferably an assembly such as that shown in FIGS. 3 and 4 above, a packaged system side IC 352, and a packaged field side IC 354. By providing these three components in separately packaged forms, a customer of such logic lines can provide the circuitry and the transformer at desired locations in a larger system, such as on a process control board in a process control system.

Figure 11:
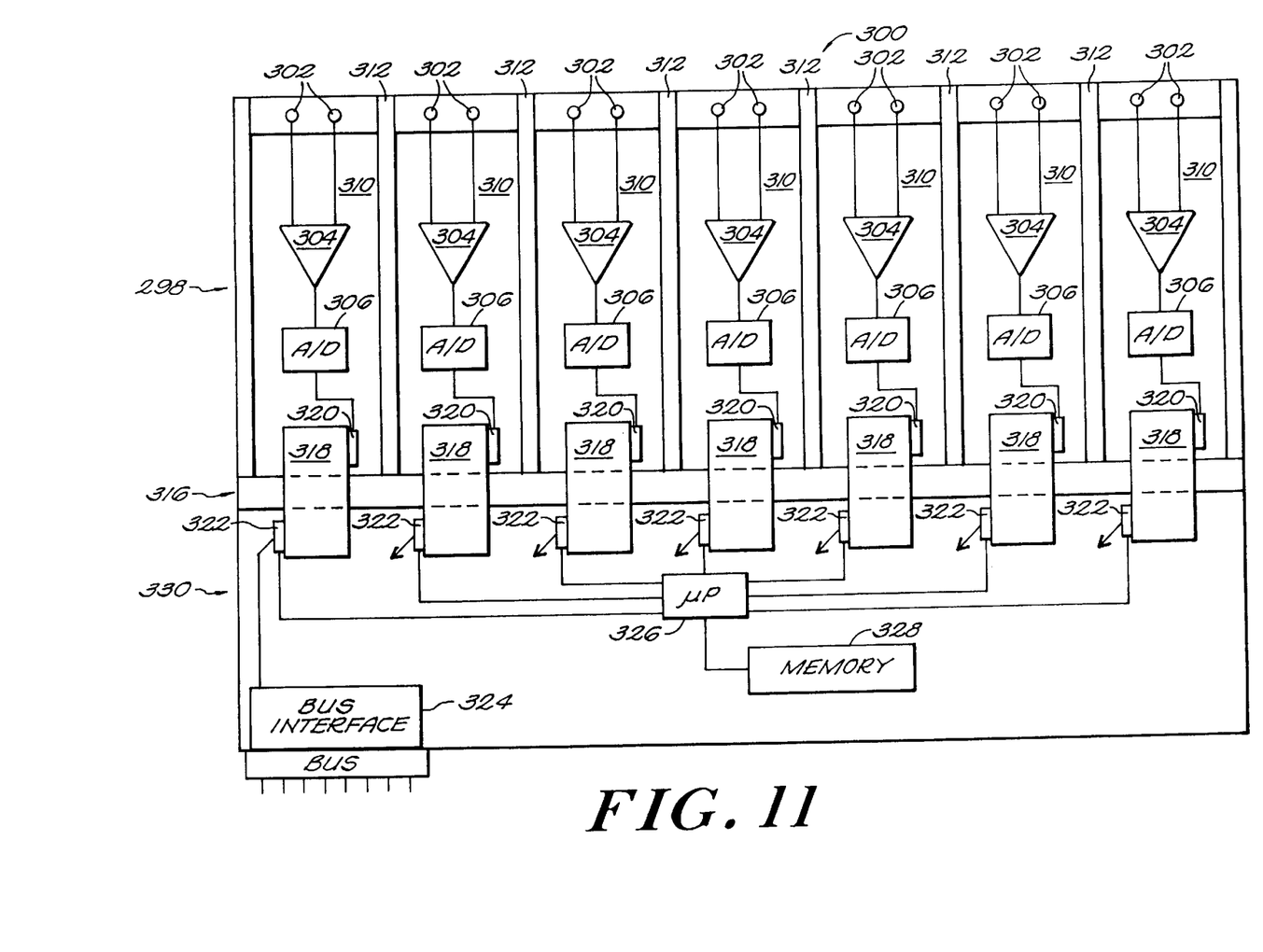
FIG. 11 is a part schematic, part plan view of an isolator as mounted on a card in a process control system.

FIG. 11 illustrates an example of how an isolation module of the type shown in FIGS. 9–10 can be used. A known I/O board in a process control system has a field side 298 with a number of pairs of screw terminals 302 for communications to and from equipment that is being monitored and controlled. Screw terminals 302 are electrically coupled to circuitry, typically including a simple pulse width modulator (PWM) or a sigma-delta converter for analog to digital conversion, then across an isolation barrier to a system side and then to a bus interface 324 for transmission off the board. As noted above, available capacitive coupling circuits are undesirable because of common mode coupling, while optical couplers take up significant space. Nonetheless, process control manufacturers have used optical couplers oriented in complex arrangements with parallel fingers extending up to the field side to hold a number of optical couplers per each pair of screw terminals.

With the module of the present invention, logic isolation can be provided in a compact arrangement for logic isolation, while also allowing additional capabilities on the field side. In particular, the circuitry can include a programmable amplifier 304 and a programmable analog-to-digital (A/D) converter 306, such as a model AD7715 Sigma Delta made by Analog Devices, Inc. of Norwood, Mass. Each pair of screw terminals 302, amplifier 304, and A/D converter 306 are mounted in a rectangular strip 310. A number of strips 310 are arranged in parallel and are physically spaced from each other with a barrier region 312 between them.

A system side 330 of board 300 is separated from field side 298 by a physical isolation barrier 316. Isolation modules 318 are preferably designed with appropriate dimensions to fit across isolation barrier 316 and also to be within the width of strip 310. Note that providing pins in a row at one end of one long side and in a row at another end of the other long side as indicated in FIG. 10 allows there to be a number of pins on each side of isolation barrier 316. On field side 298, each A/D converter 306 is coupled to a series of field side pins 320, while on system side 330, a group of pins 322 is coupled to a bus interface 324 and also to a microprocessor 326 which has associated with it nonvolatile memory 328. Other circuitry and protective features can be provided on the system side.

According to the present invention, because power can be provided from the system side to the field side through the power transformer, and because a number of data lines can be provided back to the field side, the A/D converter and the amplifier can both be made programmable to improve the signal that is actually received by the isolator. In this case, signals can be provided across the isolation barrier from the microprocessor to the other circuitry. Moreover, rather than pin programming the select pins that control which lines are IN and which are OUT, select signals can be provided from the microprocessor, so that the directions of the logic lines are controllable rather than hard-wired once during pin programming.

In one implementation, each of the digital logic lines preferably has a bandwidth of 20 Mhz and a propagation delay of 11 ns, thus providing very fast data transmission because each output is updated by input logic transitions. The isolation voltage is rated at 3,000 $V_{RMS}$ (tested at 4.8 kv), with a transient immunity of at least 10 kV/uS. The interrogation feature automatically checks the input no less than every 10 uS. This feature guarantees that the output is always valid no more than 10 uS after power up or fault conditions. Each driver requires only about 130 uA per Mhz, and each receiver requires only about 62 uA per Mhz. The total capacitance across the barrier is only 10 pf.

The DC—DC converter transformer serves as a power isolator, but is independent of the logic lines. The complete converter has an oscillator with a frequency that is established by an RC circuit. The output from the oscillator is input to the clock input of a flip-flop that divides by two for waveform symmetry. The Q and Q-not outputs of the flip-flop are input to a pair of driver transistors which provides an output to the primary side of the power coupler transformer. The secondary side of the transformer is coupled to a full-wave rectifier that provides DC output signals Having described the embodiment of the present invention, it should be apparent that modifications can be made without departing from the scope of the present invention as defined by the appended claims. For example, while the isolator has been shown with three lines OUT and two lines IN, the lines could be distributed differently so that none or all lines can be provided in either direction, and more or fewer than five lines could be provided. Additional, electrostatic shields can be provided between the transformers and a ferrite ring can be formed around the link winding in each transformer assembly to form a common mode choke. Such additional shielding can potentially increase the transient immunity to up to 100 kV/uS. As an alternative to a link wire for coupling two windings, a double shield can be formed around a first winding, with a second winding formed around the shield and around the first winding. Each shield is then grounded to each side to produce a shielded transformer.

What is claimed is:

1. A logic isolator for isolating digital logic signals, the isolator comprising:
   a transmit circuit for receiving a digital logic signal with rising and falling edges, the transmit circuit having edge detection circuitry for providing pulses that indicate relative locations in time of the rising and falling edges, the transmit circuit providing these pulses as a transmit output signal;
   a transformer assembly including:
      a first core,
      a first winding wrapped around the first core for receiving the transmit output signal,
      a second core,
      a second winding wrapped around the second core for providing a transformer output signal that is substantially similar to the transmit output signal, and
      a grounded link wire extending through the first core and the second core for grounding common mode transient signals received from the first winding of the transformer assembly; and
   a receive circuit for receiving the transformer output signal, and including circuitry for converting pulses in the transformer output signal into an isolated output signal with rising and falling edges at substantially the same relative locations as the rising and falling edges in the digital logic signal.

2. The isolator of claim 1, wherein the transmit circuit converts rising and falling edges to pulses with tri-level logic, with a first level indicating a rising edge, a second level indicating a falling edge, and a third level indicating neither the rising edge nor the falling edge.

3. The isolator of claim 1, wherein the transmit circuit further includes a pulse generator for providing pulses with a width similar to a width of the pulses indicating the rising and falling edges, the pulses indicating a DC level of the digital logic signal and being provided to the transformer assembly.

4. The isolator of claim 3, wherein the isolator includes circuitry that inhibits a further one of the pulses from being provided to the transformer assembly for some time after an edge is detected.

5. The isolator of claim 4, wherein a single one of the pulses is inhibited, such that if the period of the pulses is T, a pulse is provided at a time t after an edge is detected, with T<t<2T.

6. The isolator of claim 3, wherein the receive circuit is responsive to the pulses from the pulse generator for determining the DC level of the digital logic signal.

7. The isolator of claim 1, wherein the transmit circuit is on a first side of the transformer assembly and receives the digital input signal from a first lead, and the receive circuit is on a second side of the transformer assembly and provides the receive output signal to a second lead, the isolator further comprising a receive circuit on the first side and coupled to receive a signal from the first winding and to provide a signal to the first lead, and a transmit circuit on the second side and coupled to provide a signal to the second winding and to receive a signal from the second lead, the transmit and receive circuits on each of the first and second sides being enabled and disabled by control signals.

8. The isolator of claim 7, wherein at least one of the control signals is provided in a changeable manner.

9. The isolator of claim 7, wherein at least one of the control signals is provided from a hard-wired connection.

10. The isolator of claim 1, wherein the transmit circuit includes a Schmitt trigger for receiving the digital input signal, and a transparent latch for receiving an output signal from the Schmitt trigger and for providing a latched signal to the edge detection circuitry.

11. The isolator of claim 1, wherein there is a plurality of transmit circuits, a plurality of respective transformer assemblies, and a plurality of respective receive circuits housed together in a single module.

12. The isolator of claim 1, comprising a plurality of substantially similar transmit circuits, transformer assemblies, and receive circuits.

13. A logic isolator for isolating digital logic signals comprising:
   an input circuit for detecting rising and falling edges in an input digital logic signal, and for providing an output signal indicative of relative locations of the rising and falling edges;
   a transformer assembly with a shielded single transformer for receiving the output signal from the input circuit and for providing a signal similar to the signal received by the transformer; and an output signal circuit for receiving the signal from the transformer and for providing an output signal with rising and falling edges in the same relative locations as the rising and falling edges in the input digital logic signal.

14. The isolator of claim 13, wherein the transformer assembly includes a first core with a first winding, a second core with a second winding, and a grounded link wire having a portion around the first core and a portion around the second core for grounding common mode transients across the first winding while passing the inductively coupled input digital logic signal.

15. The isolator of claim 13, wherein the transformer assembly includes a first winding, a shield around the first winding, and a second winding around the shield and around the first winding, the first winding being a driven winding, the second winding being a receiving winding, and the shield grounded at the receiving side.

16. The isolator of claim 13, wherein the transformer assembly includes a first winding, a second winding, and two shields between the windings, with one shield being grounded to each side of the isolation barrier.

17. The isolator of claim 13, further comprising means for providing a periodic signal indicating a DC level of the input logic signal.

18. A method for logically isolating a digital logic signal comprising:

providing to a first side of an isolation barrier edge pulses indicative of rising and falling edges in a digital logic signal;

periodically generating refresh pulses with a pulse width equal to a pulse width of the edge pulses, the refresh pulses indicating a DC level of the digital logic signal;

providing the refresh pulses to the first side of the isolation barrier;

receiving a signal with edge pulses and refresh pulses on a second side of the isolation barrier; and converting the received signal to an output digital logic signal that indicates relative locations of rising and falling edges in the digital logic signal.

19. The method of claim 18, further comprising a step of inhibiting at least one refresh pulse from being provided to the first side of the transformer after an edge pulse is provided.

20. The method of claim 19, wherein the inhibiting step includes inhibiting one refresh pulse such that if the refresh pulses have a period T, a refresh pulse is provided at time t after an edge, with T<t<2T.

21. The method of claim 18, wherein the providing includes providing the refresh pulses with at least three logic levels, with a first level indicating a rising edge, a second level indicating a falling edge, and a third level indicating neither a rising edge nor a falling edge.

22. The method of claim 18, wherein the pulses are provided to a transformer assembly as the isolation barrier.

23. A digital logic isolator comprising:

a transmit circuit for receiving an input digital logic signal and including edge detection circuitry for converting rising and falling edges of the input digital logic signal into edge pulses having a pulse width, the transmit circuit providing a transmit output signal with the edge pulses;

a pulse generator for providing refresh pulses at a desired frequency, the refresh pulses indicating a DC level of the input digital logic signal;

an isolation barrier for receiving the edge pulses and the refresh pulses and for providing an isolated output signal with the edge pulses and the refresh pulses; and a receive circuit for receiving the isolated output signal and for using the edge pulses to produce an output digital logic signal with rising and falling edges at relative locations that are the same as the rising and falling edges in the input digital logic signal.

24. The isolator of claim 23, wherein the refresh pulses are logically combined with the edge pulses such that the receive circuit can use the refresh pulses to determine changes in the state of the digital logic signal even if the receive circuit does not receive a prior edge pulse indicating a rising or falling edge.

25. The isolator of claim 23, wherein the transmit circuit has circuitry for preventing pulses from the pulse generator from being provided across the isolation barrier for a period of time after a refresh pulse due to a rising or falling edge.

26. The isolator of claim 25, wherein the circuitry for preventing pulses prevents one pulse after a rising or falling edge, so that a next refresh pulse is provided at a time t after an edge, with T<t<2T, where T is the period of the refresh pulses.

27. The isolator of claim 23, wherein the isolation barrier includes a transformer assembly with a shielded single transformer.

28. The isolator of claim 23, wherein the isolation barrier includes a transformer assembly with a first core, a first winding around the first core, a second core, and a grounded link wire extending from the first core to the second core.

29. The isolator of claim 23, wherein the pulse generator includes two pulse generating units, one of which generates pulses in response to a high DC level, the other of which generates pulses in response to a low DC level.

30. The isolator of claim 29, wherein each pulse generating unit generates pulses with a period T, the pulse generating units generating pulses beginning at a time t=T after a respective rising or falling edge is detected.

* * * * *